US005212734A

United States Patent [19]

TSAO

[11] Patent Number: 5,212,734

[45] Date of Patent: May 18, 1993

[54] SHOULDER-MOUNT SPEAKER AND AUDIO EQUIPMENT

[76] Inventor: Ye-Ming, Tsao 6F-4, No. 188, Sec. 3, Ting-Chou Road, Taipei, Taiwan

[21] Appl. No.: 824,387

[22] Filed: Jan. 23, 1992

[51] Int. Cl.[5] ........................ H04R 5/00; H04R 25/00; H04B 1/38

[52] U.S. Cl. .................................... 381/188; 381/205; 381/24; 455/89

[58] Field of Search ................ 381/187, 188, 24, 205; 455/89

[56] References Cited

U.S. PATENT DOCUMENTS 4,070,553 1/1978 Hass ..................................... 381/24
4,084,139 4/1978 Jakobe .................................. 381/24

*Primary Examiner*—Jin F. Ng
*Assistant Examiner*—Sinh Tran
*Attorney, Agent, or Firm*—Bacon & Thomas

[57] ABSTRACT

A shoulder-mount speaker and audio equipment mainly consists of a pair of speaker cabinets, a soft collar member, velcro strap, and a retaining bag. The collar member has fastening means provided at its two end to allow it securely circles around the user's neck. The retaining bag hangs below the fastening means and connects to the same with an extending strip member for accommodating a light, thin, and small audio unit. The speaker cabinets are designed in such a manner that they are suitable for separately riding on the user's shoulders with their speakers facing upward and near the user's ears. The velcro strap may firmly attach to velcro pieces separately fixed onto the underside of the speaker cabinets and the inner surface of the soft collar member so that the speaker cabinets, the velcro strap, and the collar member can securely connect together and the speaker cabinets are allowed to be adjusted to a most comfortable position the user prefers. Wires with plug extending from the speaker cabinets may be concealed in the velcro strap and then connect an audio unit in the retaining bag, permitting the user to enjoy the wonderful music at any place and at any time.

1 Claim, 3 Drawing Sheets

SHOULDER-MOUNT SPEAKER AND AUDIO EQUIPMENT

BACKGROUND OF THE INVENTION

The present invention relates to a shoulder-mount speaker and audio equipment, particularly to a shoulder-mount speaker which can be fitted with a walkman as a safe and convenient audio equipment at any time.

A walkman is now so popular that almost everyone would have one. On the other hand, it is considered dangerous if it is used while operating a motorized vehicle, in addition to its possible harmful effect on the use's auditory nerve. However, there is not any effective substitute for it up to date. As it is known, good sound effect usually requires speakers to closely attach to the ears or be adequately mounted in speaker cabinets. It is quite impossible to have speaker cabinets hung on a user's ears and supported by the head or neck that shall be very inconvenient and will cause a muscle or nerve hazard on the user's neck due to excess pressure overthere. Therefore, if there are speaker cabinets designed for a walkman to provide better sound effect, they must be small in size, light in weight, and as closer as possible to the ears in position. After repeated experiments and study, it is found by the applicant that shoulders shall be the most suitable position for mounting speaker cabinets used with a walkman because the shoulders are areas nearest to our ears and any thing mounted on there shall have least hindrance on the user's other work or movement. It is therefore tried by the applicant to develop a shoulder-mount speaker and audio equipment which can eliminate the disadvantages of an existing walkman and be conveniently and safely used at any time, allowing the user to enjoy wonderful sound effect.

SUMMARY OF THE INVENTION

It is a primary object of the present invention to provide a shoulder-mount speaker and audio equipment which may improve the conventional walkman and provide good sound effect enjoyed by the user.

Another object of the present invention is to provide a shoulder-mount speaker as described above which can be safely and conveniently used without hindering the user's movement.

Other objects and advantages of the present invention will be apparent upon consideration of the following detailed description of embodiment thereof in conjenction with the annexed drawings wherein:

DETAILED DESCRIPTION OF THE PREFERRED EMBODIMENTS

Figure 1:
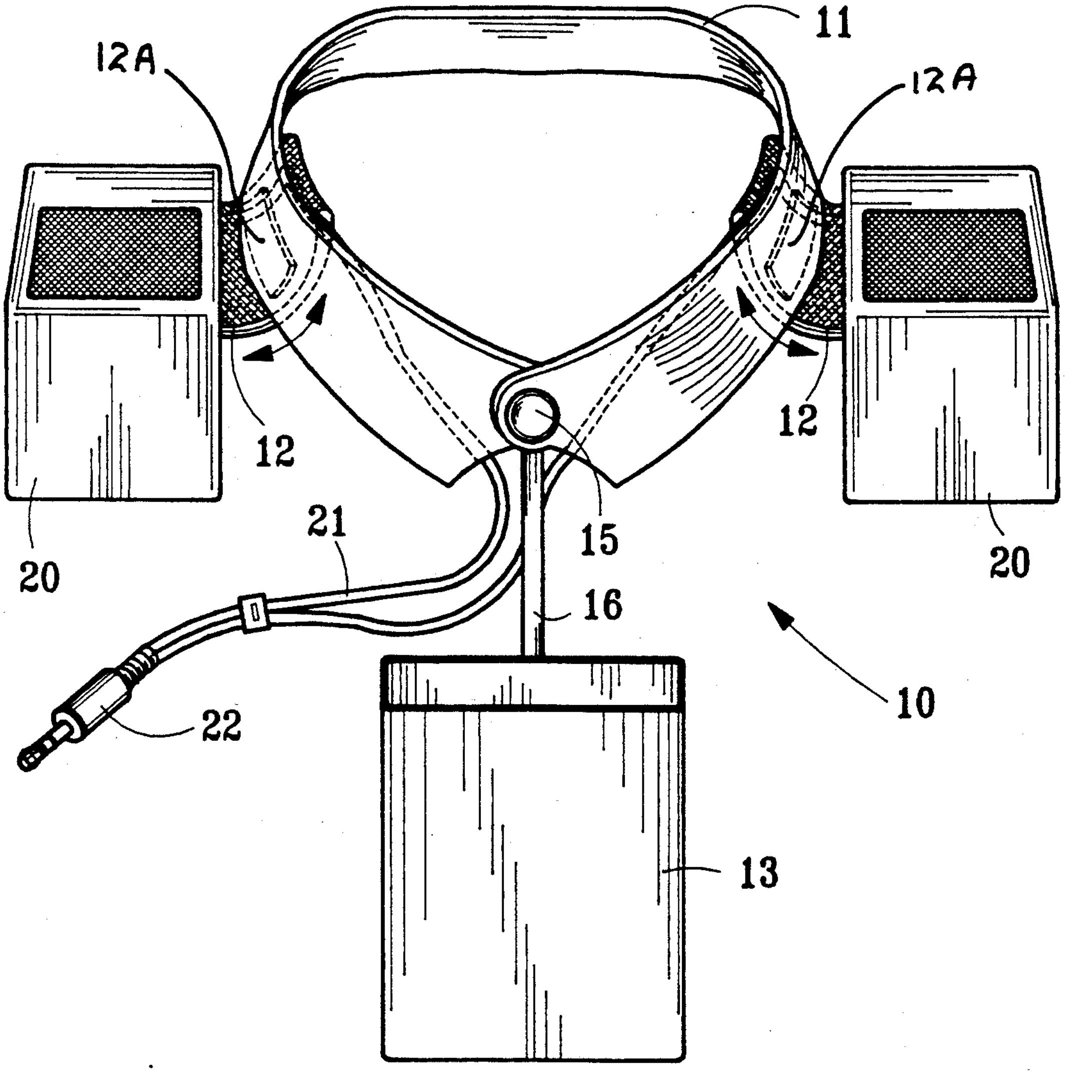
FIG. 1 is a three-dimensional perspective of an assembled shoulder-mount speaker and audio equipment according to present invention.
Figure 2:
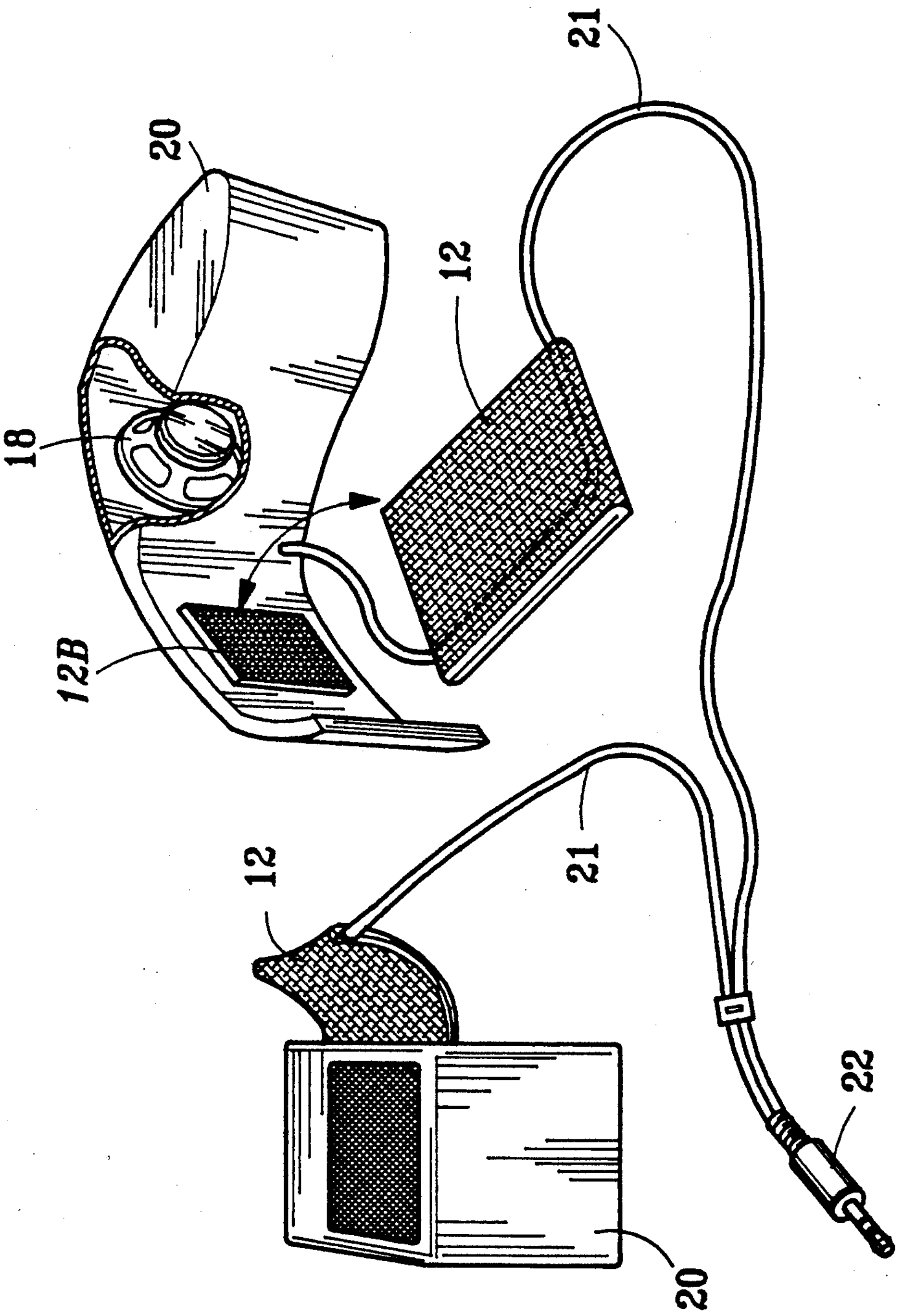
FIG. 2 shows the assemblage of the shoulder-mount speaker and audio equipment according to the present invention.
Figure 3:
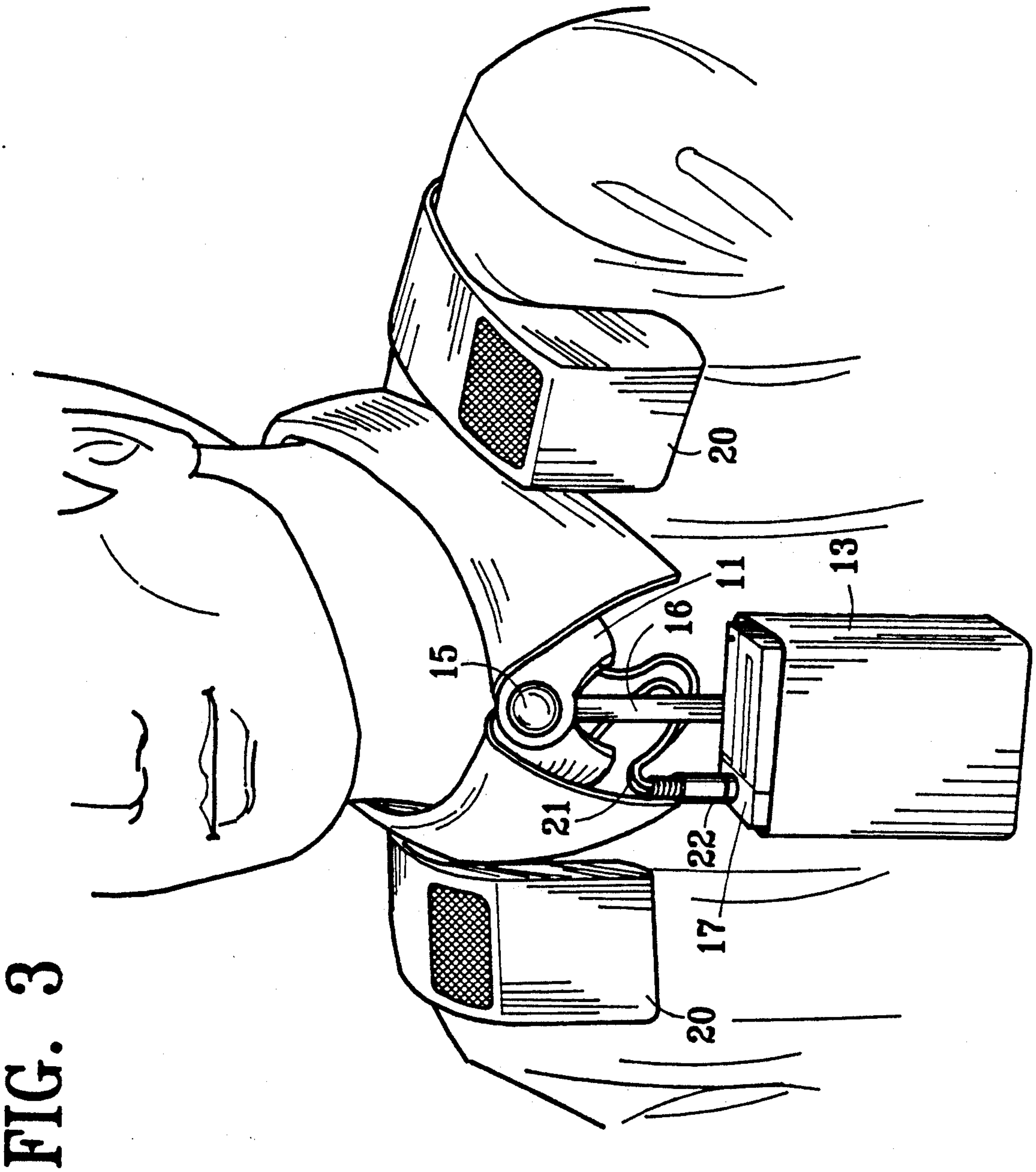
FIG. 3 illustrates a preferred embodiment of the present invention in operation.

Please refer to FIGS. 1 through 3, a shoulder-mount speaker set 10 according to the present invention mainly consists of a soft collar member 11, a pair of speaker cabinets 20, two male velcro straps 12 each detachably connected to one of the speaker cabinets 20, and a retaining bag 13. The collar member 11 is made of soft material and may be designed similar to a collar or scarf and has fastening means 15 provided at its two ends so that it may be comfortably and securely circled around a user's neck. Two pieces of first female velcro 12A are fixed to inside surface of the soft collar member 11 each at a position corresponding to the user's shoulder for receiving the male velcro strap 12. The retaining bag 13 hangs below the fastening means 15 and connects to the same with an extending strip 16 so that a thin, light, and small radio cassette player may be accommodated therein. The pair of speaker cabinets 20 are so designed that they are generally n-shaped in profile with an underside surface having adequate curve so that they are suitable for riding on shoulders and shoulders' fossasae each side one piece. Speakers 18 are disposed in a hollow inner portion of the shoulder-mount speaker cabinets 20 and let exit of sound towards the user's ears. Two pieces of second female velcro 12B are separately fixed to underside of each shoulder-mount speaker cabinet 20 at a position suitable to receive the male velcro strap 12. Wires 21 extending from the speaker cabinets 20 may pass and thereby be concealed in the male velcro straps 12 so that the speaker cabinets 20 may be more steadily and tidily mounted onto the user's shoulders.

When the present invention is to be used, just connect the male velcro strap 12 with the speaker cabinet 20 by pressing the male velcro strap 12 onto the second female velcro piece 12B, mount the speaker cabinet 20 on the shoulder and adjust the same to a most comfortable position, put the soft collar member 11 around the neck, fasten the fastening means 15, allowing the retaining bag 13 to hang in front of the chest. Then, permit the male velcro strap 12 to pass underside the collar member 11 and firmly attach the first female velcro piece 12A on inner surface of the collar member 11. At this time, the speaker cabinets 20, the male velcro strap 12, and the soft collar member 11 are properly connected together and the speaker cabinets 20 can be steadily and securely mounted on the user's shoulders and adjusted to a most comfortable position depending on the thickness and width of the user's shoulders. The length of wires 21 may be concealed underside the soft collar member 11 and the plug 22 is then plugged into the radio cassette player 17 in the retaining bag 13. The user may now enjoy a walkman at any time, any place which can be adjusted to more comfortable and stable location by user's figure. It is to be understood that the form of the invention shown and disclosed is to be taken as a preferred embodiment of the invention and that various changes in the shapes, size and arrangement of parts may be resorted to without departing from the spirit of the invention or the scope of the subjoined claims.

What is claimed is:

1. A shoulder-mount speaker and audio equipment, comprising:

a soft collar member for putting around user's neck, having two first female velcro pieces separately fixed to inner surface of said soft collar member at positions corresponding to user's shoulders, and a fastening means provided at two ends of said soft collar member so that said soft collar member may be securely circled on user's neck;

a retaining bag hanging below said fastening means of said soft collar member and being connected to the same with an downward extending strip member so as to accommodate a thin, light, and small radio cassette player therein;

two speaker cabinets each being generally n-shaped in profile with suitably formed curvy underside surface so that it may be comfortably mounted onto user's shoulder and attach to shoulder's fossasae, and being designed to have a hollow inner portion at a location corresponding to user's shoulder so that speakers may be accommodated therein and the exit of sound is toward the user's ears; said speaker cabinets each being equipped with necessary wires and a second female velcro piece; and a male velcro strap which may firmly attach to said first and said second female velcro pieces and thereby facilitates adjustable connection of said speaker cabinets to said soft collar member.

* * * * *